United States Patent [19]

Dawans et al.

[11] 3,959,161
[45] May 25, 1976

[54] LUBRICATING OIL COMPOSITIONS CONTAINING HYDROGENATED POLYBUTADIENE VISCOSITY INDEX IMPROVERS

[75] Inventors: Francois Dawans, Bougival; Emmanuel Goldenberg, Poissy; Jean-Pierre Durand, Chatou, all of France

[73] Assignee: Institut Francais du Petrole, des Carburants et Lubrifiants, Rueil-Malmaison, France

[22] Filed: Feb. 21, 1974

[21] Appl. No.: 444,283

[30] Foreign Application Priority Data
Feb. 22, 1973  France .............................. 73.06418

[52] U.S. Cl. ................................................. 252/59
[51] Int. Cl.² ........................................... C10M 1/16
[58] Field of Search ....................................... 252/59

[56] References Cited
UNITED STATES PATENTS

| | | | |
|---|---|---|---|
| 3,554,911 | 1/1971 | Schiff et al............... | 252/59 |
| 3,600,311 | 8/1971 | Naiman et al. .......... | 252/59 |
| 3,795,615 | 3/1974 | Pappas et al............ | 252/59 |

FOREIGN PATENTS OR APPLICATIONS
2,144,984  2/1973  France

*Primary Examiner*—Delbert E. Gantz
*Assistant Examiner*—Andrew H. Metz
*Attorney, Agent, or Firm*—Millen, Raptes & White

[57] ABSTRACT

A lubricating oil composition having an improved viscosity index is manufactured by admixing lubricating oil in major proportion with a butadiene polymer in minor proportion, said polybutadiene having a molecular weight of at least 20,000 and a microstructure of from 65 to 85 %

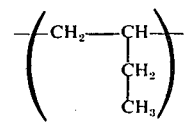

units, from 2 to 35 % of $-(CH_2-CH_2-CH_2-CH_2)-$ units and from 0 to 25 % of $-(CH_2-CH=CH-CH_2)-$ units.

9 Claims, No Drawings

LUBRICATING OIL COMPOSITIONS CONTAINING HYDROGENATED POLYBUTADIENE VISCOSITY INDEX IMPROVERS

The present invention concerns lubricating compositions having improved properties, particularly an improved viscosity index.

With respect to many applications of lubricating oils, particularly their use as lubricating oils in internal combustion engines, it is desirable that the viscosity changes of the lubricating oil be relatively small within the temperature range of use and, with particular respect to the engines, from cold starting up to hot running conditions.

The viscosity index (VI) expresses the viscosity changes of an oil when temperature is varied : the smaller these changes, the higher the viscosity index.

As a rule, the VI of lubricating oils obtained from mineral oils according to conventional processes is not sufficiently high for satisfying the very severe specifications relating to viscosity which are required by the engines of modern motor-cars; various compounds, generally polymeric compounds, have already been proposed as additives for lubricating oils, with the purpose of increasing their viscosity index and consequently broaden their field of use.

Nevertheless, in order to constitute a good VI improving additive, a compound must not have only an advantageous effect on the viscosity index of fresh oil; it must also remain stable and satisfy its VI improving function in an engine or other device in operation. For this reason, a good VI improving additive must be stable to shearing and have a good resistance to high temperatures and to oxygen and acids. It is also desirable that a VI improving additive have an advantageous effect on the pour point of the lubricating oil into which it is incorporated, or, at the very least, that it have no detrimental effect on the pour point depressors (i.e. the additives which are incorporated to lubricating oils for maintaining them fluid at low temperature).

Among the VI improvers which have been proposed in the prior technique, various polymers or copolymers of olefinic compounds may be noted, particularly certain hydrogenated polymers of conjugated dienes or their copolymers with vinylaromatic compounds.

It can thus been referred to U.S. Pat. No. 3,600,311 which describes certain hydrogenated polymers having an average molecular weight of from 1,000 to 50,000 and a microstructure consisting of about 45–90% of hydrogenated 1,4-units of the formula $-\!\!\left(CH_2-CH_2-CH_2-CH_2\right)\!\!-$ and about 10 – 55% of hydrogenated 1,2- units of the formula

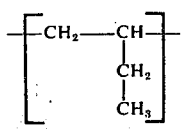

mainly used as pour point depressors for middle distillates (fuel-oils, gas-oils) and which could also be employed as VI improvers for mineral lubricating oils.

Nevertheless this improvement is not supported by experimental evidence, which evidence appears doubtful on the base of the prior art teaching. Indeed, it has been shown, for example in U.S. Pat. No. 3,554,911 (example IV) that a polybutadiene having an average molecular weight of 50,000, as prepared in the presence of butyl lithium in cyclohexane and thus containing 70–80% of 1,4-units and 20–30% of of 1,2-units, when completely hydrogenated thereafter and whose microstructure is then 70–80% of $-\!\!\left(CH_2-CH_2-CH_2-CH_2\right)\!\!-$ units and 20–30% of

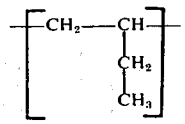

is not sufficiently soluble in a mineral lubricating oil for improving its viscosity index.

We have now found that certain hydrogenated polybutadienes, such as those prepared according to the French Pat. No. 2,144,984, (U.S. application Ser. No. 267,523) could be used as additives for improving the viscosity index of lubricating oils and satisfying as far as possible the hereinbefore given requirements.

The invention thus concerns a lubricating composition comprising a major proportion of a lubricating oil and a minor proportion of a polymer having:

1. an average molecular weight of at least 20,000 and preferably at least 50,000 particularly 30,000 to 200,000;
2. a microstructture comprising 65–85 % of

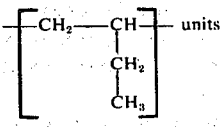

units 2–35% of $-\!\!\left(CH_2-CH_2-CH_2-CH_2\right)\!\!-$ units, and 0–25% of $-\!\!\left(CH_2-CH=CH-CH_2\right)\!\!-$ units.

The polymer according to the present invention may be obtained, for example, by polymerization of 1,3-butadiene, followed with the hydrogenation of the resulting polymer according to the technique of the above French Patent. When the polymerization has been completed, the polybutadiene contains 65–85% of 1,2-units and 15–35% of 1,4-units; this polymer will be subsequently hydrogenated.

A preferred mode of manufacturing the lubricating composition according to the invention consists of polymerizing 1,3-butadiene as a solution in a hydrorefined oil, in the presence of the compound:

$$CF_3\ COO\ Mo\ (C_3H_5)\ (CO)_3$$ 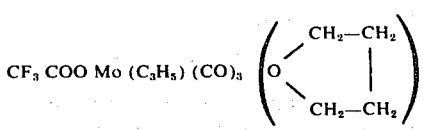

as catalyst; when more than 90% of butadiene has been converted, there is added an organometallic reducing agent, for example triethylaluminum and, if desired, any hydrogenation catalyst, for example an organic salt of nickel or cobalt. The hydrogenation of the polymer is then carried out, for example under a hydrogen pressure of from 20 to 50 atmospheres and at a temperature of from 50° to 100°C. The lubricant into which the hydrogenated polymer of the invention is incorporated may be usefully employed for manufacturing lubricating oil compositions of improved viscosity index.

The average molecular weight (by weight) of the polymer used according to the invention ranges generally from 30,000 to 200,000 and preferably from 60,000 to 100,000. The preferred structure of the polymers consists of

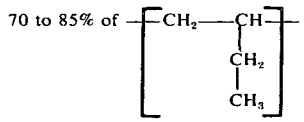

units 10 to 25% of $\{CH_2-CH_2-CH_2-CH_2\}$ and 0 to 10% of $\{CH_2-CH=CH-CH_2\}$ units.

The concentration of the polymers in the lubricating compositions may vary within broad limits. Proportions of from 0.1 to 15% and preferably from 1 to 6% by weight may be used.

The polymers according to the invention can be incorporated into the lubricating oil as such, or in the form of a concentrated solution (for example at a concentration of from 15 to 50% by weight in a solvent). As solvent, we can usefully employ a lubricating oil; volatile solvents, which can be removed after admixture of the polymer concentrate with the lubricant, are also convenient.

The polymers may also be used in the composition according to the invention, not only as the sole VI improver, but also in admixture with other conventional VI improvers.

The lubricant into which the polymer of the invention must be incorporated may comprise a synthetic lubricating oil, such as an ester oil, although the lubricant is preferably a mineral lubricating oil which can be prepared from a raw mineral oil according to conventional refining, distillation or extraction processes.

The lubricatiiong oil compositions of the invention can also contain conventional additives of lubricating oils, comprising antioxidant agents, extreme pressure additives, antiwear additives, pour point depressors, detergents, dispersants, etc . . .

Lubricating compositions having improved properties may thus be obtained, according to the invention, at low expense and according to a simple method easily adaptable to the development of a continuous process.

The method of use of the compositions of the invention will be explained more in detail in the following non-limitative examples.

EXAMPLES 1 to 4

Various lubricating compositions have been prepared by adding each of the polymers A to D, whose characteristics are given in table I, to a base oil (a hydrorefining mineral oil having a VI of 100). The average molecular weight (by weight) $\overline{M}_p$ has been determined by light diffusion on solutions of the polymer in cyclohexane. The microstructure of the polymers has been calculated from the infra-red absorption spectrum and the nuclear magnetic resonance spectrum.

EXAMPLE 1

The polymer A is prepared by hydrogenation of polybutadiene containing 78% of 1,2-units and 22% of cis 1,4-units and having an average molecular weight (by weight) of 37,500. The hydrogenation is carried out by heating at 90°C of a 15% by weight solution of polymer in toluene, at a hydrogen pressure of 40 atmospheres, in the presence of a mixture of nickel acetylacetonate and triethyl aluminum (molar ratio Al/Ni = 2) as the catalyst. The resulting polymer is admixed with the lubricating oil in the desired amount.

EXAMPLE 2

Polymer B is obtained by polymerizing a solution of 270 g of 1,3-butadiene in 400 cc of normal heptane in the presence of 2.4 g of the compound

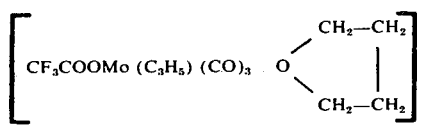

The reaction mixture is stirred at 50°C; after 30 minutes, we add 2.3 g of triethyl aluminum and the mixture maintained under a 30 atmospheres hydrogen pressure, is stirred at 85°C for 3 hours. The resulting solution is used in admixture with the lubricating oil and heptane is distilled under reduced pressure.

EXAMPLE 3

The polymer C is prepared by adding 0.57 g of the above molybdenum compound, as catalyst, to a solution of 130 g of 1,3-butadiene in 600 cc of toluene; after stirring of the mixture at 30°C for 150 minutes, we add thereto 1,000 cc of toluene containing a mixture of 2.4 g of triethyl aluminum and 1.5 g of nickel acetylacetonate, and the hydrogenation is carried out at 90°C under 25 atmospheres hydrogen pressure for 90 minutes. The polymer is isolated by settling in isopropyl alcohol and dried in vacuo up to constant weight, before re-dissolution in the lubricating oil.

EXAMPLE 4

The polymer D is manufactured directly in a hydrorefined lubricating oil, by polymerizing 70 g of 1,3-butadiene in the presence of 0.3 g of the above molybdenum compound and 200 cc of paraffinic oil (boiling point : 335°–440°C, kinematic viscosity : 11 to 17 cst at 37.8°C) for 30 minutes at 50°C and by hydrogenating the reaction solution at 90°C under 50 atmospheres hydrogen pressure for 2 hours, in the presence of a mixture of 1.2 g of triethyl aluminum and 0.7 g of nickel acetylacetonate. The resulting polymer concentrate is used for adding the required amount of polymer to the lubricating oil.

EXAMPLE 5

The thermal stability of the polymers A to C has been determined by thermogravimetry in the presence of air or nitrogen (feed rate : 4.5 liters per hour); the heating rate of the polymers is 4°C per minute. Table II gives the temperatures at which the loss of weight of the samples amounted to 2 and 10% of the initial weight of the sample (temperatures $T_2$ and $T_{10}$).

EXAMPLE 6

The viscosimetric properties of the lubricating compositions prepared according to examples 1 to 4 are given in table III. The polymer concentrations are also given in table III. The viscosities at −17.8°C have been determined by means of an apparatus CCS (ASTM D 2602-71). The pour point, as determined according to the ASTM method D 97-66 with some of these lubricating compositions, is about −24°C; the oil alone has a pour point of −17°C.

EXAMPLE 7

The good stability of the polymers A to D, as VI improvers for lubricating oils, is shown by the results reported in table IV.

The determination of the stability with respect to ultimate shearing is carried out according to a sonic decomposition test (5 minutes at 10,000 hertz), according to the procedure of ASTM D 2603-70. The viscosity increase, as determined at 37°8 C, after treatment of an oil containing 1% of polymer, in the presence of 1% of [4,4′-methylene bis (2,6 di tertiobutylphenol)] as antioxidant at 165°C in open air, is given in table IV for different times (Indiana test, under powerful stirring, in the presence of steel and copper plates).

TABLE III-continued

| Lubricant | Viscosimetric properties of the lubricating compositions Viscosity in centistokes at | | | | Viscosity index |
|---|---|---|---|---|---|
| | −17.8°C | 37.8°C | 98.9°C | 150°C | (VI) |
| base oil | 2820 | 48.20 | 6.70 | 2.89 | 100 |
| Poly- % mer b.w. | | | | | |
| D   1.7 | — | 119 | 15.4 | 6.17 | 145 |

TABLE IV

| Lubricant | Viscosimetric stability of the lubricating compositions | | | |
|---|---|---|---|---|
| | % loss of viscosity after shearing (5 min. 10,000 hertz) | % viscosity increase after treatment at 165°C in air for | | |
| | | 24 h | 48 h | 72 h |
| base oil | | 9.2 | 20.8 | 24.5 |
| + Polymer | | | | |
| − A | 1.2 | — | — | — |
| − B | 2.3 | 5.1 | 17.4 | 28 |
| − C | 2.7 | 0.2 | 8.1 | 10.5 |
| − D | 4.4 | — | — | — |

EXAMPLES 8–11

Various lubricating compositions have been prepared by adding to a base oil (hydrorefining mineral oil 200 N), various concentrations of each of the polymers E to H whose properties are given in table V.

The polymers E and F have been prepared as solutions in normal heptane and the polymers G and H as solutions in toluene, in the presence of the π-allyl complex of tricarbonyl molydenum trifluoracetate solvated with one molecule of tetrahydrofuran (see polymer B); the respective concentrations of catalyst and 1,3-butadiene are from 1.4 to 2.5 × 10$^{-3}$ gram-atom of molybdenum and from 3 to 5 moles of butadiene per liter of reaction mixture.

The hydrogenation of the polymers has been carried out directly after polymerization by adding from 1.7 to 3×10$^{-3}$ gram-atom per liter of a transition metal derivative ($M_t$) previously reacted with triethylaluminum (molar ratio Al/$M_t$ = 1 − 2.5). With respect to polymer E synthesis, the transition metal derivative was molybdenum stearate; it was cobalt octoate for polymer F, nickel acetylacetonate for polymer G and nickel decanoate for polymer H.

TABLE I

| Polymers | $\overline{M}_p$ | Properties of the polymers % of units | | |
|---|---|---|---|---|
| | | $-[CH_2-CH(CH_2CH_3)]-$ | $-(CH_2-CH_2-CH_2-CH_2)-$ | $-(CH_2-CH=CH-CH_2)-$ |
| A | 36,000 | 80 | 10 | 10 |
| B | 71,200 | 82.5 | 2.5 | 15 |
| C | 80,000 | 79 | 21 | 0 |
| D | 160,000 | 75 | 19 | 6 |

TABLE II

| Polymer | Thermal stability of the polymers (°C) | | | |
|---|---|---|---|---|
| | Under nitrogen | | Under air | |
| | $T_2$ | $T_{10}$ | $T_2$ | $T_{10}$ |
| A | 382 | 407 | 276 | 385 |
| B | 370 | 400 | 270 | 375 |
| C | 395 | 415 | 344 | 396 |

TABLE III

| Lubricant | Viscosimetric properties of the lubricating compositions Viscosity in centistokes at | | | | Viscosity index |
|---|---|---|---|---|---|
| | −17.8°C | 37.8°C | 98.9°C | 150°C | (VI) |
| base oil | 2820 | 48.20 | 6.70 | 2.89 | 100 |
| Poly- % mer b.w. | | | | | |
| A   4 | 5420 | 113 | 14.1 | 5.53 | 135 |
| B   4 | 5660 | 125 | 15 | 6.23 | 133 |
| C   4 | 7810 | 203 | 24.50 | 9.36 | 160 |

TABLE V

| Polymer | $\overline{M}_\mu$ | $\overline{M}_\mu/\overline{M}_n$ | Properties of the polymers % of units | | |
|---|---|---|---|---|---|
| | | | $\left[\begin{array}{c}-CH_2-CH-\\ |\\ CH_2\\ |\\ CH_3\end{array}\right]$ | $-(CH_2-CH_2-CH_2-CH_2)-$ | $-(CH_2-CH=CH-CH_2)-$ |
| E | 84900 | 2.42 | 68 | 32 | 0 |
| F | 71000 | 2.04 | 78 | 22 | 0 |
| G | 57000 | 2.96 | 69 | 27 | 4 |
| H | 123000 | 2.72 | 73 | 26 | 1 |

EXAMPLE 12

The evolution of the thickening power of the various polymers E to H as a function of temperature is given in table VI also stating the concentration of the polymers in oil.

TABLE VI

| Polymer | Concentration % by weight | Viscosity properties of the lubricating compositions Viscosity in centistokes at | | | |
|---|---|---|---|---|---|
| | | 0°C | 37.8°C | 98.9°C | 150°C |
| — | 0 | 430 | 42 | 6.3 | 2.7 |
| E | 2.1 | 1336 | 115 | 15.1 | 6.1 |
| F | 2.3 | 1244 | 112 | 14.4 | 5.8 |
| G | 2.6 | 1178 | 106 | 13.7 | 5.5 |
| H | 1.8 | 1387 | 119 | 15.4 | 6.2 |

EXAMPLE 13

The stability of polymers E to H as VI improvers for lubricating oils is shown by the test results of table VII. Shearing stability tests have been carried out on the lubricating compositions of table VI, according to the procedure of ASTM D 2603-70. The viscosity changes after treatment in the air at 165°C have been determined at 37.8°C on the lubricating compositions containing 1% by weight of polymer in the presence of 1% by weight of an anti-oxidant additive: 4,4-methylene bis (2,6-ditertiobutylphenol) : (Indiana test).

TABLE VII

| Polymer | Viscosimetric stability of the lubricating compositions | | | | |
|---|---|---|---|---|---|
| | % loss of viscosity after shearing (10 000 Hertz) | | % variation of viscosity after treatment in air at 165°C for | | |
| | 5 mn | 10 mn | 24 h | 48 h | 72 h |
| E | 8 | 12.4 | +0.4 | +7.2 | +8.9 |
| F | 5.4 | 9.2 | −2.2 | +5 | +5.6 |
| G | 3.5 | 6.1 | — | — | — |
| H | 10 | 17 | −12.4 | −9.9 | −2.8 |

EXAMPLE 14

Polymers E and H have been used in tests carried out with a Petter W.1 - A engine according to CEC 1-101-A 69 standard, in order to determine whether the presence of added polymers has a determined effect on the engine. The base oil is paraffinic lubricating oil 200 N and the polymer concentration is 1.7% by weight. We have determined the gumming degree of the skirt, the piston head and the scraper ring. The results are summarized in table VIII.

TABLE VIII

| Polymer | Time (hours) | Tests on Petter W.1-A engine Gumming (10 = clean) | | |
|---|---|---|---|---|
| | | skirt | top | scraper |
| — | 108 | 10 | 7.5 | 10 |
| E | 108 | 10 | 7.0 | 10 |
| H | 180 | 10 | 9.0 | 10 |

These engine tests show that the polymers do not contribute to gumming the engine. Furthermore in the test carried out with the oil containing the polymer H, the loss of weight of the bearings which is only 9 mg after 180 hours, shows the stability to oxidation of the lubricating compositions of the invention.

We claim:

1. A lubricating composition comprising a major amount of lubricating oil and 1-6% by weight of said lubricating oil of a viscosity-index-improving amount of an at least partially hydrogenated butadiene polymer having an average molecular weight (by weight) of 30,000–200,000 and a microstructure comprising from 65 to 85% of

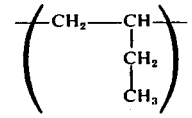

units from 2 to 35% of $-(CH_2-C_2-CH_2-CH_2)-$ units and from 0 to 25% of $-(CH_2-CH=CH-CH_2)-$ units.

2. A lubricating composition according to claim 1, wherein the butadiene polymer has a molecular weight of from 60,000 to 100,000.

3. A lubricating composition according to claim 1 wherein the butadiene polymer contains from 70 to 85% of

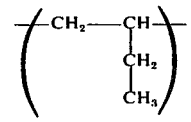

units, from 10 to 25% of $-(CH_2-CH_2-CH_2-CH_2)-$ units and from 0 to 10% of $-(CH_2-CH=CH-CH_2)-$ units.

4. A lubricating composition according to claim 1, wherein the polymer is an at least partially hydrogenated polybutadiene having 65 - 85% of 1,2-units and 15 - 35% of 1,4-units.

5. A composition according to claim 4, the butadiene polymer having been hydrogenated in a solvent under hydrogenation conditions in the presence of the compound

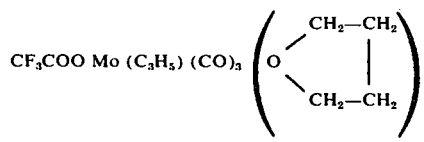

as catalyst.

6. A composition according to claim 4, wherein the polymer is manufactured as a solution in a lubricating oil.

7. A composition according to claim 1, wherein the lubricating oil is a mineral lubricating oil.

8. A concentrate of a viscosity index improving additive in a lubricating oil, comprising a major amount of a lubricating oil and a proportion of 15–50% by weight of an at least partially hydrogenated butadiene polymer having an average molecular weight (by weight) of 30,000–200,000 and a microstructure comprising from 65 to 85% of

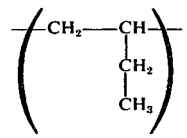

units from 2 to 35% of $-(CH_2-CH_2-CH_2-CH_2)-$ units and from 0 to 25% of $-(CH_2-CH=CH-CH_2)-$ units.

9. A composition according to claim 5 wherein the hydrogenation conditions are: a pressure of 20–50 atmospheres and a temperature of 50°–100°C.

* * * * *